(12) United States Patent
Lamminmäki et al.

(10) Patent No.: US 8,182,602 B2
(45) Date of Patent: May 22, 2012

(54) METHOD OF PREPARING A WELL-DISPERSABLE MICROCRYSTALLINE TITANIUM DIOXIDE PRODUCT, THE PRODUCT, AND THE USE THEREOF

(75) Inventors: Ralf-Johan Lamminmäki, Ulvila (FI); Esa Latva-Nirva, Düsseldorf (DE); Riitta Linho, Pori (FI); Johanna Niinimäki, Pori (FI); Visa Vehmanen, Pori (FI)

(73) Assignee: Sachtleben Pigments Oy, Pori (FI)

( * ) Notice: Subject to any disclaimer, the term of this patent is extended or adjusted under 35 U.S.C. 154(b) by 13 days.

(21) Appl. No.: 12/673,360

(22) PCT Filed: Aug. 15, 2008

(86) PCT No.: PCT/FI2008/050466
§ 371 (c)(1),
(2), (4) Date: Jul. 13, 2010

(87) PCT Pub. No.: WO2009/022061
PCT Pub. Date: Feb. 19, 2009

(65) Prior Publication Data
US 2011/0192322 A1    Aug. 11, 2011

(30) Foreign Application Priority Data

Aug. 16, 2007 (FI) .................................. 20070618

(51) Int. Cl.
*C01G 23/04* (2006.01)
*C09C 1/36* (2006.01)

(52) U.S. Cl. ....................................... 106/436; 423/610

(58) Field of Classification Search ................. 106/436; 423/610
See application file for complete search history.

(56) References Cited

U.S. PATENT DOCUMENTS

| 2,448,683 A | 9/1948 | Peterson |
| 2002/0165308 A1 | 11/2002 | Kinniard et al. |
| 2005/0233146 A1 | 10/2005 | Nonninger |

FOREIGN PATENT DOCUMENTS

| CA | 962142 A1 | 2/1975 |
| EP | 0 270 472 A1 | 6/1988 |
| EP | 0 444 798 A2 | 9/1991 |
| EP | 1930297 A1 * | 6/2008 |
| FI | 57124 C | 6/1980 |
| JP | 2005-187543 A | 7/2005 |
| WO | WO-01/12555 A2 | 2/2001 |
| WO | WO-03/068682 A1 | 8/2003 |
| WO | WO-2005/049496 A2 | 6/2005 |

OTHER PUBLICATIONS

European Search Report issued Jun. 16, 2010, in EP No. 08787739.5.

* cited by examiner

*Primary Examiner* — Anthony J Green
(74) *Attorney, Agent, or Firm* — Birch, Stewart, Kolasch & Birch, LLP (57) ABSTRACT

The invention relates to a method of preparing a well-dispersable, rutile-structured, microcrystalline titanium dioxide product, a product prepared by the method, and an effect paint and a lacquer provided by means of the product. In the method, the titanium dioxide starting material is first treated with a base to have an alkaline pH value, after which it is treated with an acid to have a hydrochloric acid content of 8 to 30 g/l, neutralized, processed, and calcinated. In particular, the preparation method is characterized by the use of a pretreatment chemical before the calcination stage to improve the dispersability.

13 Claims, 7 Drawing Sheets

METHOD OF PREPARING A WELL-DISPERSABLE MICROCRYSTALLINE TITANIUM DIOXIDE PRODUCT, THE PRODUCT, AND THE USE THEREOF

The present invention relates to a method of preparing a rutile-structured, microcrystalline titanium dioxide product that is well-dispersable, a product provided by the method, and an effect paint and a wood lac provided by means of the product.

PRIOR ART

The properties of microcrystalline titanium oxide differ from those of the conventional, pigmentary titanium dioxide that is known as white pigment. The deviations are due to the difference in crystal size, as the crystal size (10 to 100 nm) of microcrystalline titanium oxide is about 5 to 10 times smaller than that of conventional titanium dioxide (160 to 250 nm). With the crystal size decreasing, the hiding power of titanium dioxide in the range of visible light disappears and the pigment becomes transparent. On the other hand, the permeability to UV radiation decreases. Accordingly, microcrystalline titanium dioxide is well-suited for a UV protective agent. Because of its small crystal size and large specific surface area, microcrystalline titanium dioxide is useful, for example, in cosmetics, catalysts, ceramic materials, and as effect pigments in paints.

One difficulty in the preparation of microcrystalline titanium dioxide is to create, adjust, and retain the desired crystal and particle size distributions throughout the process, the desired size distribution including both the average size and a narrow width of the size distribution. The control of the purity and the crystal and particle size distributions of the titanium dioxide product are important factors when assessing the various methods of preparation. Furthermore, the preparation processes should be energetically and economically profitable and environmental-friendly.

$TiO_2$ can occur in three different crystal forms. Rutile is a stable form at high temperatures. Anatase is a prevailing form at low temperatures. At low temperatures, a brookite form can also occur, which generally is found only in minerals that occur in an orthorhombic crystal form. Rutile is known as the most durable crystal form and its permeability to UV light is lower than that of anatase.

It is a known fact that it is easier to prepare mixtures of anatase and rutile than pure rutile. By calcining titanium dioxide in the anatase form in the presence of what are called rutilizing chemicals, such as zinc, for example, a mixture of anatase and rutile can be generated even at lower temperatures.

Microcrystalline titanium dioxide can be prepared by various methods, either using a gas phase technique or precipitation. The source of titanium can comprise, for example, titanium tetrachloride, titanium alkoxide, or titanium hydrate prepared from ilmenite. For the preparation of rutile, various precipitation methods have been patented, references to some of them being incorporated in the previous patent specification EP 0 444 798 of the applicant.

Patent specification EP 0 444 798 discloses a method of preparing microcrystalline titanium dioxide, wherein at the first stage, titanium dioxide hydrate is treated with a base so as to have an alkaline pH value, and at the second stage, the treatment is continued with hydrochloric acid to adjust the final content of hydrochloric acid to between 8 and 25 g/l. At the third stage, the acidic mixture is neutralized with the base, and the neutralized reaction mixture can be after-treated by calcining, for example. By adjusting the content of hydrochloric acid of the second stage, it was possible to carry out the neutralization of the third stage to a lower pH value of 4 to 6 than usually, whereby useful rutile crystals were obtained, having a crystal size of less than 100 nm, such as 25 nm, and a suitable crystal size distribution, such as 10 to 50 nm, according to the examples, which can be adjusted by means of calcination parameters. In the method, savings can also be achieved in the amount of chemicals needed at the process stages. However, preparing a well-dispersable product from the titanium dioxide thus obtained, typically, requires several times of grinding before or during the after-treatment. This consumes a substantial amount of energy as extra process stages, thus increasing the production costs.

Through grindability, the quality properties of the final product are also substantially influenced. Along with good dispersability, in addition to a small crystal size, several applications require a narrow or controlled crystal size distribution, which is essentially influenced by the grindability.

In the preparation of pigmentary titanium dioxide, it is well-known to use pretreatment chemicals to prevent or accelerate the rutilizing of titanium dioxide, in particular, and to improve the grindability of the calcined product. This has not been the case in the preparation of rutile-structured microcrystalline titanium dioxide. Reasons for this include, first, that the mass that is then fed to the calcination is already in rutile form, i.e., there has been no need to control the change in the crystal form in the calcination. Another reason has been that the temperatures used in the calcination of microcrystalline titanium dioxide are lower than in the preparation of pigmentary titanium dioxide. Because of the lower calcination temperature, the mostly sulphate-based pretreatment chemical salts, which are conventionally used in calcination, do not decompose in the calcination of microcrystalline titanium dioxide, as is the case when calcining pigmentary titanium dioxide, whereby these salts remain in the product that is obtained from the calcination of microcrystalline titanium dioxide. It is known that these sulphate residues of the end product in the calcined microcrystalline titanium dioxide product considerably impede its dispersability.

Patent specification CA 962 142 discloses a preparation method of low-crystalline titanium dioxide, wherein a titanium hydrate mass prepared from ilmenite is treated with sodium hydroxide to form a titanium hydrate cake. At the beginning, the pH is adjusted with hydrochloric acid to between 2.8 and 3.0, and at a later stage of cooking, the ratio of acid and titanium dioxide is adjusted to a value of 0.26. At the end of the cooking, the slurry is neutralized with ammonia to a pH value of 6.5. In the method, during the acid cooking, $K_2O$ and $P_2O_5$ are added as calcination chemicals. Thereafter, titanium oxide is filtered and washed, after which the filtrate is calcined at 500° C. to 800° C., until titanium dioxide with a particle size of 50 to 150 nm, 125 nm according to the example, is obtained. However, sufficiently low-crystalline, microcrystalline titanium oxide is not obtained by this method, the crystal size remaining above 100 nm. When using the pretreatment chemical composition according to this method, the formation of melt does not begin until at a temperature of about 640° C. and a complete melting is achieved at about 800° C.

Patent specification WO0112555 discloses a hydrometallurgical method of preparing ultra-fine titanium oxide from the aqueous solutions of titanium chloride. In the method, a chemical control agent is used, which is added to the titanium chloride solution that is hydrolyzed and evaporated until dry, whereby a thin film of amorphous titanium dioxide is formed. The chemical control agent is added to control the crystal form and the particle size. Suitable chemical control agents have proven to be organic compounds and their salts; inorganic compounds, such as the chloride, carbonate, fluoride, sulphate and phosphate salts of sodium, potassium, aluminium, tin, and zinc, phosphoric acid, and the mixtures thereof; polyacrylates, glycols, siloxanes, and the mixtures thereof. However, the examples only describe the results that are obtained by using phosphoric acid. The objective is to adjust the crystal form of titanium dioxide, after evaporation, by means of calcination and chemicals, in a desired direction either into the anatase or rutile form, or mixtures thereof. The thin film of titanium dioxide that is formed after the calcination is ground to release the elementary particles (about 30 to 50 nm) and to provide a microcrystalline titanium oxide having a suitable specific area (BET 33 to 43 $m^2/g$). To improve the physical properties, such as the crystal size and grindability and the conversion of the crystal structure, the said chemical control agents can also be added to the dried amorphous titanium oxide before calcination. The method involves the total evaporation of the solution above its boiling point and below the temperature, where essential crystal growth occurs. In this method, a large amount of solvent must be used, which has to be evaporated, inevitably resulting in a high energy consumption and signifying high operating costs. In connection with this method, the dispersability has not been dealt with; neither has the dependence between it and the grindability.

Purpose of the Invention

The purpose of the present invention is to eliminate the disadvantages disclosed in connection with the methods described above. Another purpose of the invention is to provide an easy-to-grind and well-dispersable rutile-structured microcrystalline titanium dioxide, which is suited to be used in car paints and wood lac compositions, for example.

Another purpose of the present invention is to disclose a new method of preparing a titanium dioxide product that has the said advantageous properties, wherein easily available and advantageous starting materials and simple process stages can be used.

A further purpose of the invention is to prepare the said titanium dioxide product as economically as possible in terms of the amounts of chemicals used and the energy required, and also using easy-to-handle process chemicals and equipment.

Short Description Of The Invention

The objects of the present invention presented above are achieved by a method of preparing a well-dispersable, rutile-structured, microcrystalline titanium dioxide product having a crystal size of less than 60 nm from a titanium dioxide starting material, the method comprising the stages: (A) treating a titanium dioxide starting material to convert it into titanium dioxide so that (A1) the titanium dioxide starting material is treated with a base to have an alkaline pH value; (A2) a precipitate obtained from stage A1 is further treated with hydrochloric acid so that the final hydrochloric acid content is adjusted to 8 to 35 g/l; (A3) the precipitate obtained from stage A2 is neutralized into slurry to a pH value of 4.0 to 6.0: (A4) the neutralized slurry obtained from stage A3 is primed with a pretreatment chemical; (A5) the primed slurry obtained from stage A4 is calcinated; and (B) the titanium dioxide obtained from stage A is further treated to convert it into a titanium dioxide end product and the products of the present invention which are a well-dispersable, rutile-structured, microcrystalline titanium dioxide product having a crystal size of less than 60 nm; a) a U/V*100 p rat value defined from its turbidity curve being 500 or more; b) its specific surface area, BET, being 55 $m^2/g$ or less; and c) its particle size distribution $d_{50}$ being less than 0.150 µm; and d) the transmission of the transmission curve of the lacquer film containing particles being at least as permeable as the transmission of the curve B' shown in FIG. 3 and a well-dispersable, rutile-structured, microcrystalline titanium dioxide product having a crystal size of less than 60 nm prepared by the above-described method. The invention also also relates to products that contain the said titanium dioxide product, such as an effect paint and a wood lacquer.

Using a pretreatment chemical, such as potassium dihydrogen phosphate, before calcining the rutile-structured microcrystalline titanium dioxide in the method described, it was surprisingly observed that the dispersibility and the transparency of the thus obtained end product improved without any appreciable weakening in its photostability.

DETAILED DESCRIPTION OF THE INVENTION

The method according to the present invention comprises at least stage A with its sub-stages and stage B, preferably with its sub-stages, which in the following are described in detail.

By means of a known method, the titanium-bearing substance is brought into a suitable form, a titanium dioxide starting material, for processing at stage A. This titanium-bearing substance can comprise ilmenite, a concentrate thereof or some other impure raw material of titanium dioxide, from which the titanium-bearing titanium dioxide starting material suitable for stage A can be prepared. The titanium dioxide starting material is preferably made of ilmenite. The titanium dioxide starting material can also comprise a titanium compound of any commercial process, which is capable of precipitation or recrystallization.

The titanium dioxide starting material is preferably a solid titanium dioxide hydrate precipitate, which is obtained from ilmenite by a sulphate process. It is more preferably made of ilmenite, a concentrate thereof or another impure titanium dioxide raw material, by the method described in patent EP 0 444 798.

By the method according to the present invention, a well-dispersable rutile-structured microcrystalline titanium oxide product with a crystal size of less than 60 nm, preferably less than 50 nm, is prepared from the known titanium dioxide starting material described above by means of the following sub-stages A1 to A5 of stage A.

At sub-stage A1, the titanium dioxide starting material is treated with a base, preferably an aqueous solution of sodium hydroxide, at a raised temperature so as to have an alkaline pH value, essentially according to patent EP 0 444 798. The titanium dioxide starting material is elutriated in water and the base is added to the slurry. The base concentration is preferably made to correspond to about 300 to 350 g NaOH per liter of $H_2O$. The raised temperature is preferably about 60° C. or more.

In a preferred embodiment according to the invention, the titanium dioxide starting material being an intermediate product of the sulphate process, such as titanium dioxide hydrate, the base treatment into sodium titanate that is soluble in hydrochloric acid is preferably carried out at about 95° C. or more, preferably for two hours. The treatment can be carried out in a reactor that is heated with indirect steam and provided with agitation. The pH of the product treated with the base is preferably over 11.

The titanium mass obtained after the base treatment is washed, preferably hot or with hot water, preferably with water of below 60° C., and filtered. The purpose is to wash the mass free of sulphate ions, whereby the washing result and the residue content can be examined by the barium chloride test in a known manner.

At sub-stage A2, the sodium-bearing titanium mass obtained at stage A1 is re-elutriated in water. This sulphate-free sodium-bearing filtrate cake is preferably elutriated in distilled water to a concentration of 140 to 200 g TiO2/l, more preferably about 180 g TiO2/l.

According to an embodiment, the temperature of the slurry is raised to 40 to 45° C., preferably at a speed of about 1° C./min.

To lower its pH, acid, preferably hydrochloric acid is added to the titanium dioxide starting material, preferably sodium titanate, which has been turned into slurry and treated with the base.

The final acid concentration is adjusted to 8 to 35 g HCl/liter, preferably 29 to 31 g HCl/liter. The HCl content can be re-examined by titration and corrected, when so needed. After this, the temperature of the slurry thus generated is slowly raised to 88 to 95° C., preferably to about 90° C. The speed of raising the temperature is preferably about 1° C./min, and the slurry is agitated during heating. Cooking is continued for about two hours to form rutile crystals. It has been observed that the values of the parameters used, such as the hydrochloric acid concentration and the temperature, influence the form of the rutile crystal thus provided.

The rutile content of the product obtained after the acid treatment is more than 99.0%, preferably more than 99.5%.

At sub-stage A3, the precipitate described above and obtained from stage A2 is neutralized into slurry of a slightly acidic pH value essentially according to patent EP 0 444 798. In the neutralization, the pH is raised to a value of 4 or more; however, to a value of 6 or less, and preferably to a value of 4.4 to 5.0. The neutralization can be carried out with a suitable alkaline neutralizing chemical, preferably sodium hydroxide or sodium carbonate. The titanium dioxide mass obtained after the neutralization is filtered and washed. When the neutralization is carefully carried out to a pH value of 6 or less, or preferably 5 or less, the filtration and washing are extremely successful, whereby essentially all of the sodium and chloride ions that impede further processing can be removed from the mass.

At sub-stage A4, the rutile-structured titanium dioxide slurry obtained from stage A3, of which over 95.0%, preferably over 99.5% is in rutile form, is primed with a suitable pretreatment chemical. The pretreatment chemical is added to the titanium dioxide mass in connection with the agitation. The pretreatment chemical is preferably added as fine-grained, solid, dry powder. After the addition, the mass is agitated for at least an hour, preferably more than 4 hours before starting to feed it to the furnace.

The pretreatment chemical in this invention refers to a chemical, which is used in connection with controlling the calcination to affect the growth of crystals and the transition temperature of the crystal structure, which is the typical meaning of the term in the field. In connection with this invention, it preferably refers to the pretreatment chemical used in the calcination of $TiO_2$.

The pretreatment chemical is a substance that is in a form that controls the growth of crystals and also forms the needed melt at a low temperature. The pretreatment chemical is preferably potassium dihydrogen phosphate, $KH_2PO_4$ or a mixture of potassium and phosphoric compounds, which before or during calcination reacts into potassium dihydrogen phosphate or a compound similar to potassium dihydrogen phosphate. In that case, for example, a mixture of potassium sulphate, $K_2SO_4$, and ammonium phosphate, MAP, can be considered. Phosphoric acid, for example, can also function as the source of phosphorus. The pretreatment chemical is most preferably potassium dihydrogen phosphate, $KH_2PO_4$. It has been observed that when using different potassium and phosphoric compounds as pretreatment chemicals, they form in the calcination a suitable melt that controls the crystal growth, and they can either together or separately be fed into the mass that is to be mixed.

The amount of pretreatment chemical needed, expressed as potassium dihydrogen phosphate, is 0.2 to 1% by weight, preferably 0.5 to 0.7% by weight, and most preferably about 0.6% by weight. If the content is less than 0.2% by weight, a sufficient effect is no longer obtained. The amount of chemical respectively needed also depends on the calcination temperature, the calcination time and the desired crystal size, and can thus be determined by an expert in the field. If the content is essentially over 1% by weight, the crystals start to overgrow under the corresponding calcination conditions. Furthermore, if too much pretreatment chemical is used, it becomes more difficult to wash off potassium, for example, and the process stage becomes complex and the operating costs increase.

A property that is required of the pretreatment chemical is an ability to form a melt at the calcination temperature. It preferably forms the melt clearly below the calcination temperature, whereby the viscosity of the melt decreases to as low as possible at the operating temperature according to the invention. The melting temperature of the pretreatment chemical is preferably below 730° C., more preferably below 670° C., most preferably below 350° C., such as 253° C. When using a mixture of separate compounds, no perfect melting is required, but it is enough to be clearly within the liquidus, i.e., partly molten; however provided that the amount of melt is sufficient.

Using potassium dihydrogen phosphate provides the advantages of the preparation of pigmentary titanium dioxide. In addition, potassium dihydrogen phosphate forms a melt favourable for the formation of crystals already at a very low temperature of about 253° C., enabling the movement of atoms on the surface of the crystal and furthering the calcination transaction already at a low temperature, whereby an end product with a smaller crystal size is provided. The phosphor of the chemical remains on the surface of the crystal and, for its part, improves the dispersability of the crystals in the aqueous phase. In that case, also the grindability improves. Neither does the chemical essentially change the pH value of the product thus obtained. It was observed that using the pretreatment chemical exhibited an effect of improving the grindability of the product after calcination, in particular.

The slurry-like product obtained after the pretreatment is calcinated at sub-stage A5. The calcination is preferably carried out at a temperature of 350 to 800° C., more preferably at a temperature of 560 to 770° C., most preferably at a temperature of 650 to 750° C. The selection of the calcination temperature is influenced, for example, by the composition of the feed material, the water content used, the dwell time, and the calcination gases. By a combination of different factors, conditions are provided, wherein the crystal size and the crystals size distribution of the discharge of the calcination furnace are as desired. The calcination parameters of the salt-free, rutile-structured titanium dioxide mass according to the invention can be used to simply and accurately adjust the crystal size and the crystal size distribution of microcrystalline titanium dioxide. During the calcination, the crystals are agglomerated, after which they are ground to the desired particle size. After the calcination, the crystal size of the titanium dioxide according to the invention is preferably over about 10 nm, yet less than 60 nm, preferably less than 50 nm, most preferably about 30 nm. The rutile content of the product after calcination is over 99.0%, preferably over 99.5%. The crystals of the calcinated pigment are essentially ellipsoidal.

The calcination time is 0.5 to 5 hours, preferably 1 to 3 hours. Neither the precipitation stage, nor the calcination stage is carried out at pressurized conditions, but at a normal pressure.

In a preferred embodiment, when using potassium dihydrogen phosphate as pretreatment chemical, discharge of calcination is provided, which when elutriated in water is much easier to grind than the conventionally un-primed calcinated microcrystalline rutile-structured titanium dioxide.

Typically, to achieve the desired particle size, it has been necessary to grind the product many times; for example, about 5 to 6 times of grinding after calcination, and, finally, after coating, spray-grinding, for example. In that case, the energy consumption is high and, despite the grinding, no desired crystal size and narrowness of the crystal size distribution have been achieved. These disadvantages can now be avoided by the method according to the invention. Furthermore, in the after-treatment wash of the discharge of calcination, the part of the pretreatment chemical, potassium, which is disadvantageous to the end product, can be washed off the end product.

At stage B, the rutile-structured microcrystalline titanium oxide that is obtained from stage A (A1 to A5) can be further processed into a titanium dioxide end product by any means known in the art. The further processing is preferably mainly carried out by the method described in patent specification EP 0 444 798.

According to a preferred embodiment according to the invention, stage B includes the following further processing stages that are disclosed in specification EO0444798, an extra wet-grinding stage B4 having been added thereto:

B1 The mass obtained from calcination is wet-ground;
B2 The mass obtained from wet-grinding is surface-treated;
B3 The surface-treated mass is filtered and washed;
B4 The mass obtained from stage B3 is wet-ground again;
B5 The mass obtained from stage B4 is spray-dried and spray-ground to prepare the final titanium dioxide product.

At processing stage B1, the calcinated titanium dioxide obtained from stage A (A5) is elutriated in distilled water to form thick slurry. The elutriation is preferably carried out by means of a dispersing agent, more preferably monoisopropanolamine, MIPA. The thickness of the slurry is 500 to 600 g $TiO_2$/l, preferably about 550 $TiO_2$/l. The mass obtained from calcination is wet-ground by a known means in a sand grinder, for example. The U/V*100 value of the product obtained after grinding is preferably over 850.

At processing stage B2, the ground titanium dioxide mass obtained from stage B1 is coated by any known means according to its purpose of use, for example, with aluminium, silica, and/or zirconium compounds. The method used can comprise, for example, the processing methods disclosed in patent specification FI 62130.

At processing stage B3, after the coating treatment B2, the product is filtered and washed with water. An inorganic coating agglomerates microcrystalline titanium dioxide intensively.

At processing stage B4, the coated titanium dioxide mass obtained from stage B3 is re-elutriated in water and the slurry is wet-ground. Before starting the grinding, or if there is no wet-grinding stage, an organic additive of the drying plant, such as methylol propane, TMP, methylol ethane or silicon (see FI57124) is added to the feeding slurry before feeding it to the drying plant. The coating agent used is preferably TMP. The amount of TMP used is 2 to 8% by weight, preferably 2 to 6% by weight, most preferably about 5% by weight. The purpose of the grinding is to make the TMP mix with the feed of the drying plant as evenly as possible. The grinding is carried out at a low thickness, preferably 130 to 270 g/l and at a high feed, whereby the grinding efficiency per ton of $TiO_2$ remains low. The grinding efficiency used depends on the equipment used and the capacity and it is obvious to those skilled in the art.

The wet-grinding treatment after coating further improves the dispersability and the transparency of the titanium dioxide end product. Neither was wet grinding observed to increase the photo-activity of the titanium dioxide end product, which is important for the applications of the product. Earlier, it was believed that it is no longer possible to use efficient grinding after the after-treatment, as the coating breaks and valuable properties are lost, for example, the photostability weakens. However, this was not the case; instead, by adding the wet-grinding stage between the coating and the spray drying according to the invention, better dispersability was achieved without losing the photostability.

At processing stage B5, the coated and wet-ground titanium dioxide mass from stage B4 is spray-dried and spray-ground to provide the final titanium dioxide end product in a manner known in the art.

Figure 3:
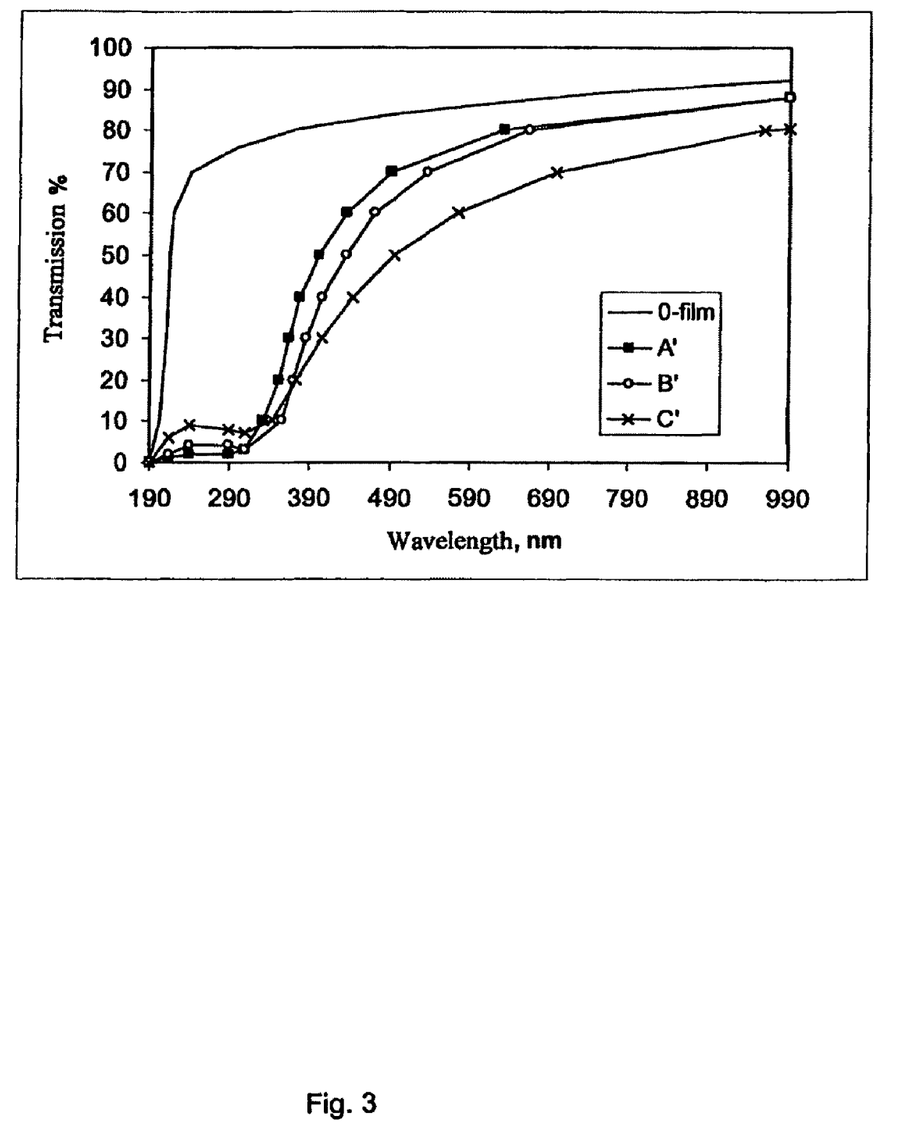
FIG. 3 shows the transparency of the titanium dioxide products prepared by the method according to the invention.
Figure 4:
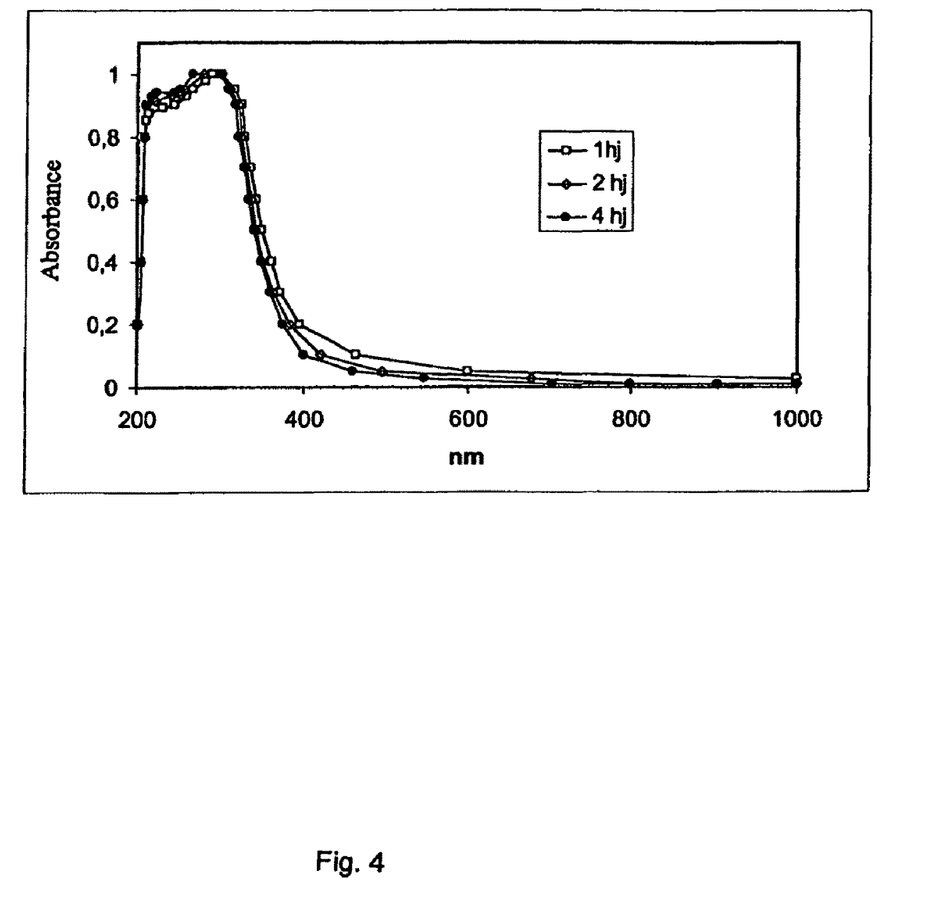
FIG. 4 shows the dependence of the dispersability of the titanium dioxide product prepared by the method according to the invention on the times of grinding.

The present invention also relates to a new rutile-structured microcrystalline titanium dioxide product described above. The crystal size ($d_{50}$) of the product is less than 60 nm, preferably less than 50 nm, the crystal size is more preferably 20 to 40 nm, most preferably about 30 nm, the particle size $d_{50}$ is less than 0.150 μm and it is well dispersible, U/V*100 p rat is 500 or more. The specific surface area, BET, of the product thus obtained is 55 $m^2$/g or less, and its photostability is preferably less than 10. The titanium dioxide product according to the invention is also characterized by a good transmission of visible light, which can be seen from FIG. 3B'. FIG. 3 shows the transmission curve of a lacquer film that contains the particles of the titanium dioxide product according to the invention. The transmission of the transmission curve of the lacquer film containing the product according to the invention is at least as good or permeable as the transmission of the curve shown in FIG. 3B'. Typically, the permeability or the transmission is described by the value T=60%, which is obtained at wave length 490 nm.

According to a preferred embodiment, the crystal size of the product is 20 to 40 nm, more preferably about 30 nm. The crystal size can be varied within the method, depending on the purpose of use.

The good dispersability of the product according to the invention refers to a property, which is defined by a turbidity measurement. In the measurement, the change in the absorbance of a sample dispersed in an aqueous phase overnight is observed as a function of the wave length by means of spectrophotometry in a manner known in the field. U/V*100 p rat can be calculated from the measured curve, which can be used to describe the width or the narrowness of the particle size distribution. The higher the U/V*100 value, the narrower the particle size distribution, i.e., the better the product has been ground and, further, the better the dispersability of the product. In connection with the invention, the term "good dispersability" refers to a property, which is obtained for a product that has a U/V*100 p rat value of 300 or more, preferably 500 or more.

The U/V*100 p rat value of the product according to the invention is preferably over 550. This indicates that it also provides an extremely good UV protection, due to the steepness of the curve.

The dispersability depends on various factors, but in this case, the particle size proved to be the most essential one. When the particle size decreases, the dispersability deteriorates, due to the natural tendency of the particles to flocculate.

The specific surface area of the titanium dioxide product according to the invention, BET, is $\leq 55$ m$^2$/g, preferably $\leq 50$ m$^2$/g, when the crystal size distribution $d_{50}$ is 30 ±5 nm. Most preferably, when the average crystal size is $d_{50}$ 30±3 nm, BET$\leq$45 m$^2$/g.

The product according to the invention has a low average particle size, which, however, is easy to control, and a narrow particle size distribution. This distribution is preferably achieved by using in the calcination a pretreatment chemical, such as potassium dihydrogen phosphate. In addition, an extra wet-grinding stage is more preferably used in the preparation before spray-drying and spray-grinding. The product according to the invention is most preferably prepared by the method as described above. Using the method according to the invention, a definitely better-dispersable microcrystalline product can be prepared compared with the method mentioned in patent specification EP 0 444 798.

Furthermore, the titanium dioxide product according to the invention is very photostable. Typically, the photostability is described by the formation rate of acetone, as described in patent specification FI20040186; however, with the distinction that, as the gas to be decomposed, it uses a mixture of aldehyde and toluene instead of propanol, and the photostability is described by the formation rate of $CO_2$, and not by that of acetone. The titanium dioxide product according to the invention is characterized by the formation rate of acetone, which is less than 10 ppm/h, preferably less than 5 ppm/h.

The new titanium dioxide product according to the invention is preferably prepared according to the method described above. The product prepared by the method according to the invention is characterized by an easy-to-grind discharge of calcination, whereby the final particle size distribution of the end product can be controlled by a definitely smaller number of grinding times. It was further observed that adding the extra wet-grinding stage B4 made the grindability easier and the particle size distribution narrower. The number of grinding times needed can preferably be halved.

The optimal control of the particle size and the particle size distribution provided for the product according to the invention implies a considerably better dispersable product, further intensifying the metallic lustre property, the flip-flop effect, required for certain product applications.

In a preferred embodiment, the new titanium dioxide product according to the invention can be used in effect paint compositions, such as lustrous car paints, to provide an extremely strong angle dependence of the wave length of visible light and the effect of reflection. In that case, a paint composition is provided, which can be used to provide a bright golden flip effect, wherein 20° b* is 8 or more, and a deep blue flop effect, wherein 115° b* is −11 or less.

The invention discloses an effect paint containing the titanium dioxide product according to the above, giving the paint the flip-flop effect. The paint is preferably used to provide a flip effect, wherein 20° b* is 8 or more, and a deep blue flop effect, wherein 115° b* is −11 or less.

The invention further discloses a wood lac composition, wherein the titanium dioxide product according to the invention can be used as a UV protection.

The invention is illustrated by means of the following examples. If not mentioned separately, the starting materials and materials are commercially available products or they can be manufactured by a known technique.

EXAMPLES

Example 1

Figure 1:
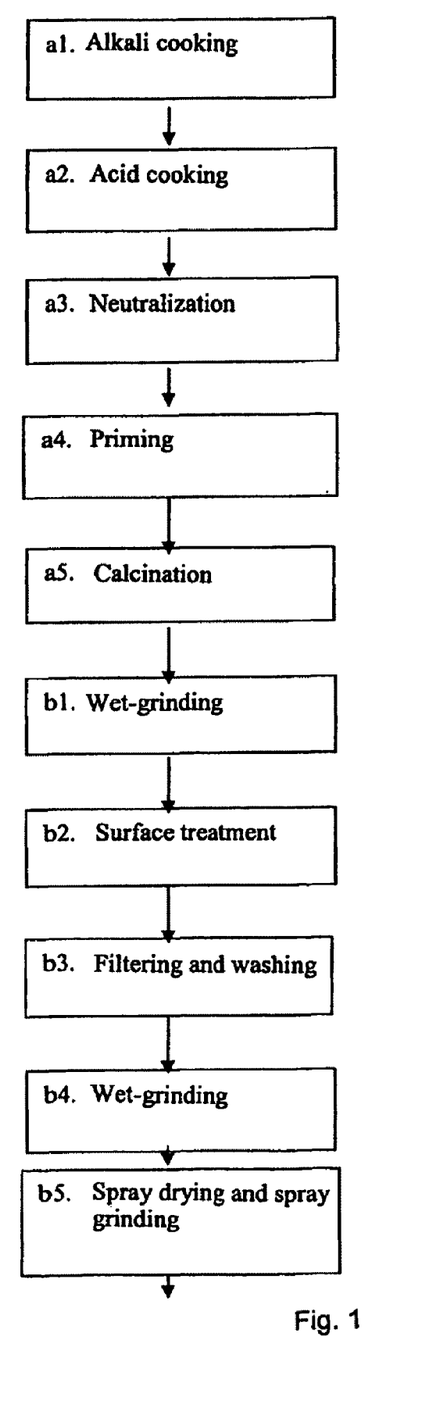
FIG. 1 shows the process flow chart according to an embodiment for implementing the method according to the invention.

FIG. 1 shows essentially the process stages used in the preparation of titanium dioxide. The preparation of titanium dioxide by the sulphate method is started by reacting ilmenite concentrate with sulphuric acid. The solid reaction cake thus obtained is dissolved by means of water and waste acids. Impurities are removed and the iron sulphate is crystallized out. The titanium-bearing solution is concentrated and the titanium dioxide hydrate is precipitated by hydrolyzation. This precipitation mass is washed in several stages to remove the salts.

About 10 tons of this washed precipitation mass, expressed as $TiO_2$, are taken and elutriated with water to provide a thickness of 300 to 400 g/l, the aim being 350 g/l. The slurry thus obtained is rendered highly alkaline, pH>11, by adding about 15 tons of NaOH as a NaOH solution at 60° C., its concentration being 700 g/l. The temperature of the slurry is raised to 95° C. and it is agitated at this temperature for two hours. In the treatment, the titanium hydroxide mass reacts with lye, forming a solid sodium titanate, from which the sulphate ions are further removed by washing the slurry with hot water until no sulphates are found in the filtrate, when precipitated with barium chloride (FIG. 1, stage A1).

The sulphate-free sodium-bearing filtrate cake is elutriated in water so that the concentration of the slurry, expressed as titanium dioxide, is about 180 g/l. The slurry is heated to a temperature of 40 to 45° C. at a velocity of 1° C./min. The acid content of the slurry is set to 30 g of HCl/l by an addition of a 30-% hydrochloric acid solution to create rutile-structured crystals. When needed, the content of HCl is adjusted by titration and corrected. The temperature of the slurry is slowly raised to 90° C. at a velocity of 1° C./min and under constant agitation. At this temperature, the slurry is cooked under agitation for 120 min (FIG. 1, stage A2).

Finally, the slurry is neutralized with sodium carbonate or sodium hydroxide so that the pH settles at 4.7 to 4.8. The neutralized slurry is filtered and washed with about four liters of distilled water. The dry content of the filtrate cake is thus about 30% (FIG. 1, stage A3).

10 t of washed cake, expressed as $TiO_2$, are taken and elutriated with water to provide a thickness of 150 to 250 g/l, i.e., about 40 to 50 m³ of slurry is obtained. The elutriation is carried out in a container provided with an agitator, to which about 60 kg of powdery commercial $KH_2PO_4$ are added as pretreatment chemicals. The slurry is allowed to mix for about 4 h before starting the furnace feed (FIG. 1, stage A4).

A sample is taken from the furnace feed and dried, an X-ray diffractogram is taken, and more than 99.0% of the microcrystalline titanium dioxide is found to have the rutile crystal form.

Figure 7:
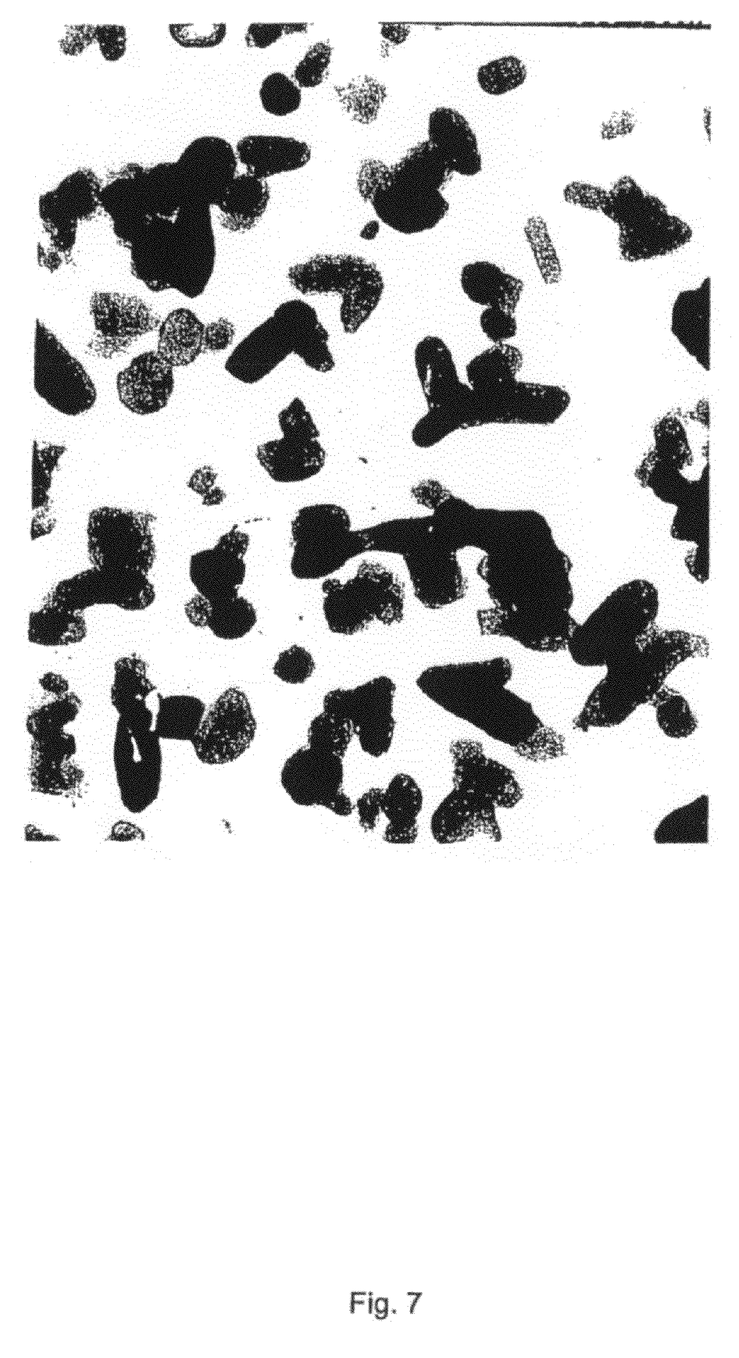
FIG. 7 is an electron microscopic image measured from a product prepared by the method according to the invention.

The titanium dioxide filtrate cake is calcinated in a continuous rotating reel oven at a temperature of 720° C. The dwell time is about one hour on an average. When measuring the electron microscopic image of the calcined rutile-structured product, the average crystal size is about 30 nm, the width of the distribution being 10 to 50 nm. The sodium content of the calcined product is less than 0.1% and the chloride content less than 0.05% (FIG. 1, stage A5). The electron microscopic image of the product thus created is shown in FIG. 7 (mag. 160 000).

The titanium dioxide free of salts is elutriated in distilled water as thick slurry by means of a dispersing agent. The wet-grinding is carried out in a sand grinder. Typically, the product is wet-ground three times (FIG. 1, stage B1).

The crystals that are ground apart from each other are after-treated with aluminium, silicon, and/or zirconium compounds, according to the purpose of use. The samples are now coated with zirconium oxide (1.0%) and aluminium oxide (4.0%) (FIG. 1, stage B2). As a recipe, other known recipes for the treatment of titanium dioxide pigments can also be used, such as, for example, those presented in patent specification FI62130.

5% of TMP are added to the washed and filtered coated mass sample, after which it is wet-ground one more time before spray-drying (FIG. 1, stages B3 and B4).

The spray-dried microcrystalline $TiO_2$ is spray-ground into fine powder having a crystal size of about 30 nm (FIG. 1, stage B5). The particle size is definitely larger, about 0.1 μm, measured by the Master Malvernsize device.

After the spray-drying, the UV-vis spectrum of the end product thus obtained is measured from the aqueous slurry. It is observed to be almost on the same level as the spectrum of the product at the sand-grinding stage after the calcination stage.

Example 2

The effect of the preparation method on the grindability, dispersability, and the particle size distribution of the samples is examined.

The grindability is assessed both on the basis of the turbidity curves measured with a spectrophotometer and the particle size distributions measured with Malvern Mastersizer 200.

The samples are prepared according to Example 1 so that the precipitation mass that was cooked with acid is filtered and washed; whereafter 0.6% of potassium dihydrogen phosphate are added to the mass. The mass is calcinated in a rotating reel oven at 730° C. for about 1 hour. After the calcination, the oven discharge is wet-ground four times in the sand grinder. The particles are coated with zirconium and aluminium oxides ($ZrO_2$ 1.0% of $TiO_2$, and $Al_2O_3$ 4.0% of $TiO_2$), and filtered and washed with water. 5% of TMP are added to the mass, whereafter the sample is divided into two parts. Sample A is subjected to an extra wet-grinding before spray-drying and spray-grinding. Sample B is dried and ground without the extra wet-grinding. Reference sample C is prepared in a manner described in patent EP 0 444 798, Example 1, to a particle size of 30 nm (EP 0 444 798, Example 9). Calcinated product C is subjected to the after-treatment stages similarly to Sample B.

The spray-ground end product samples A, B, and C are dispersed in ion-exchanged water, to which 0.1% by volume of analysis-pure 1-amino-2-2propanol (MIPA) has been added. The turbidity within the range of 350 to 1100 nm is measured from the dilute aqueous dispersions with a spectrophotometer at the intervals of one nanometer.

In Table 1, the degree of fineness of the pigment is determined by means of four quantities:
  1) abs(max), the absorption maximum wavelength [nm],
  2) U/V*100, the absorption of the absorption maximum wavelength divided by a 450-nm wavelength absorption *100,
  3) abs(max), the absorption at the absorption maximum wavelength, and
  4) abs(450 nm), the absorption at a wavelength of 450.

TABLE 1

| Quantity | A | B | C |
|---|---|---|---|
| 1 | 322 | 329 | 339 |
| 2 | 560 | 305 | 197 |
| 3 | 1.01 | 1.0 | 0.99 |
| 4 | 0.18 | 0.34 | 0.52 |

Figure 2:
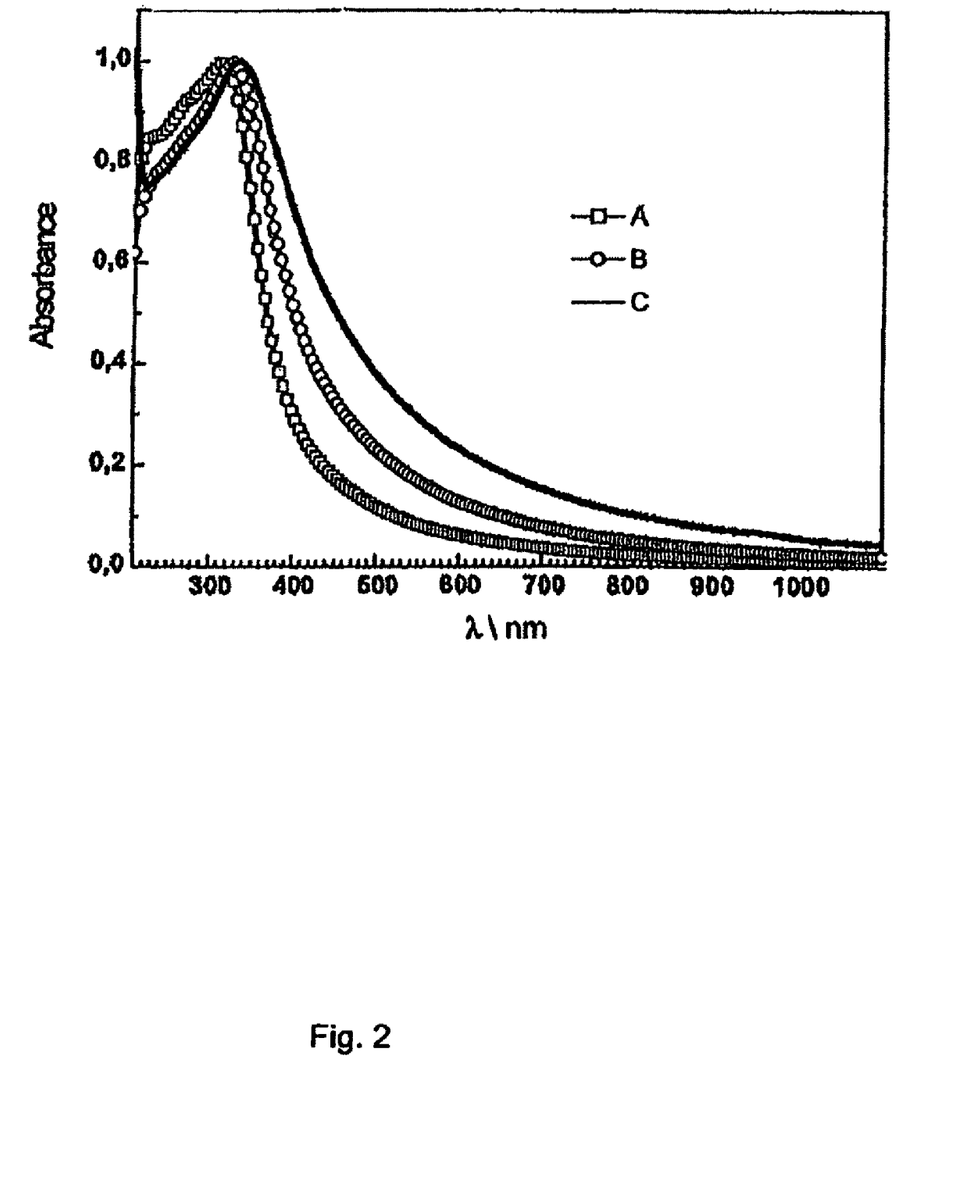
FIG. 2 shows the dispersability of the titanium dioxide products prepared by the method according to the invention.

FIG. 2 shows the UV-vis spectra of products A and B compared with that of product C. With respect to the reference product, the microcrystalline pigment A or B that is prepared according to the invention is definitely better ground and dispersed. Thus, the dispersability improves, when the product is prepared using a pretreatment chemical, product B, compared with reference product C. The dispersability is further improved to a value U/V*100 is 550 or more, when in addition to the pretreatment chemical, the extra wet-grinding stage is used before the spray-drying, product A.

Example 3

The particle size distributions are measured from products C and A according to Example 2 by Malvern Mastersize 2000. In the method, the sample is elutriated to form a suspension, and the suspension in a continuous cycle is guided to a flow-through cuvette, through which a laser beam is focused. The particles of the sample scatter the monochromatic laser beam at different scattering angles, depending on their size. The intensity of the radiation scattered at different angles is measured. The particle size distribution of the sample is calculated from the scattered intensities according to the Mie or Fraunhofer theories. The measurement is carried out in accordance with the operating instructions of the device.

Figure 6:
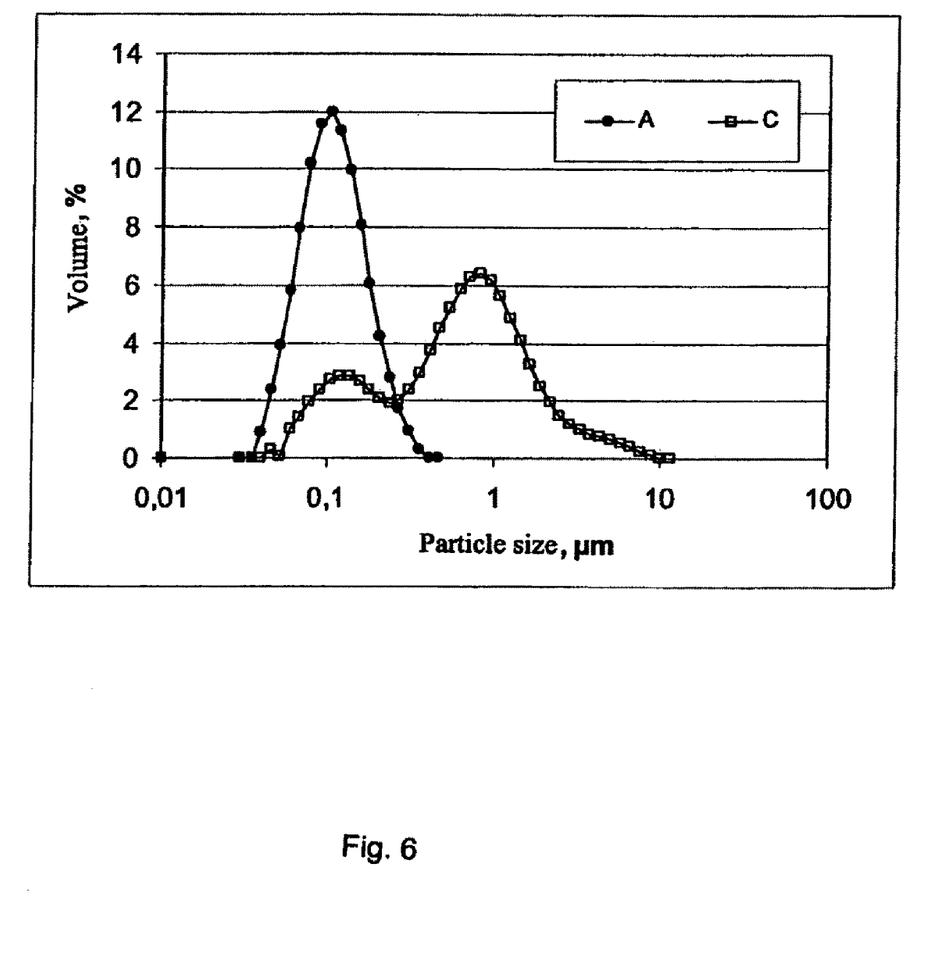
FIG. 6 shows the particle size distribution of the product prepared by the method according to the invention.

FIG. 6 and Table 2 show the particle size distributions. The particle size distribution of the sample of reference product C is definitely bimodal and the $d_{50}$ value definitely higher.

TABLE 2

| Sample | $d_{10}$ | $d_{50}$ | $d_{90}$ |
|---|---|---|---|
| C | 0.103 μm | 0.606 μm | 1.806 μm |
| A | 0.056 μm | 0.099 μm | 0.182 μm |

Example 4

The photoactivities of products A, B, and C of Example 2 are measured by a known gas phase method.

In the method, 2-propanol is injected into a closed chamber. The powdery sample on a Petri dish is illuminated by a Xe lamp. 2-propanol first decomposes into acetone and, finally, into carbon dioxide. The formation of carbon dioxide is essentially a consequence of the photocatalytic activity. A higher number represents higher photoactivity.

The photoactivity results thus obtained are shown in Table 3.

TABLE 3

| Sample | Formation of $CO_2$, ppm/h | Formation of acetone, ppm/h |
|---|---|---|
| A | 0 | 7 |
| B | 0 | 6 |
| C | 7 | 8 |

On the basis of the results in Table 3, it could be established that the extra wet-grinding stage does not increase the photocatalytic activity of product A, which is important for the applications.

Example 5

Product G that was prepared by the method described in Example 1 was compared with other products A to F available on the market, which had as similar chemical compositions as possible. The properties examined were:
1. Rutile crystal size (nm) defined by X-ray diffraction (XRD) by a known method.
2. Specific surface area, BET ($m^2/g$), defined by a known method.
3. Quantity U/V*100 that describes the dispersability, defined from the turbidity curve.
4. Photostability, measured as the formation speed of acetone (ppm/h).

On the basis of the measurement results shown in Table 4, it can be observed that the photostability of product G according to the invention is superior compared with other rutile-structured titanium dioxide products. At the same time, product G provides an extremely good dispersability. The narrowness of the crystal size distribution with respect to the reference samples appears as a lower BET value, whereas the narrower particle size distribution appears as a higher U/V*100 value.

TABLE 4

|   | A | B | C | D | E | F | G |
|---|---|---|---|---|---|---|---|
| 1 | 27 | 47 | 22 | 27 | 25 | 29 | 29 |
| 2 | 51 | 37 | 53 | 61 | 71 | 60 | 42 |
| 3 | 549 | 306 | 473 | 369 | 363 | 300 | 640 |
| 4 | 53 | 80 | 357 | 18 | 17 | 13 | 2 |

Example 6

Lacquer films A', B', and C' (reference film) are further made from titanium dioxide products A and B, and reference product C, which were made according to Example 2. The titanium dioxide is mixed with a 2.0% by weight water-thinnable acrylic varnish base by combining the aqueous $TiO_2$ dispersion with the base composition and agitating (Skandex BA-EL-T) for about 5 minutes. The viscosity of the lacquer composition is adjusted to 25-30 s/DIN-Becher 4 mm.

FIG. 3 shows the transmission spectra of the lacquer films. The transmission of Film B' is definitely better in the whole area of the visible spectrum compared with Film C'. The transmission further improves on film A' throughout the spectral range, compared with films B' and C'.

The reference values for the various wavelengths are shown in Table 5. The 0-film is the basic lacquer composition without titanium dioxide.

TABLE 5

| Wavelength | 0-film | A' | B' | C' |
|---|---|---|---|---|
| 375 | 80 | 40 | 24 | 20 |
| 400 | 81 | 50 | 37 | 29 |
| 550 | 85 | 74 | 70 | 57 |

Example 7

Titanium dioxides A, B, and C and B' that were made by the methods described in Example 2, B' deviating from product B with respect to its calcination temperature 670° C., are mixed with 1.5 and 2.0% by weight TiO2/2% by weight Al groundcoat paint composition of a car, suitable for a metal-effect paint.

Figure 5:
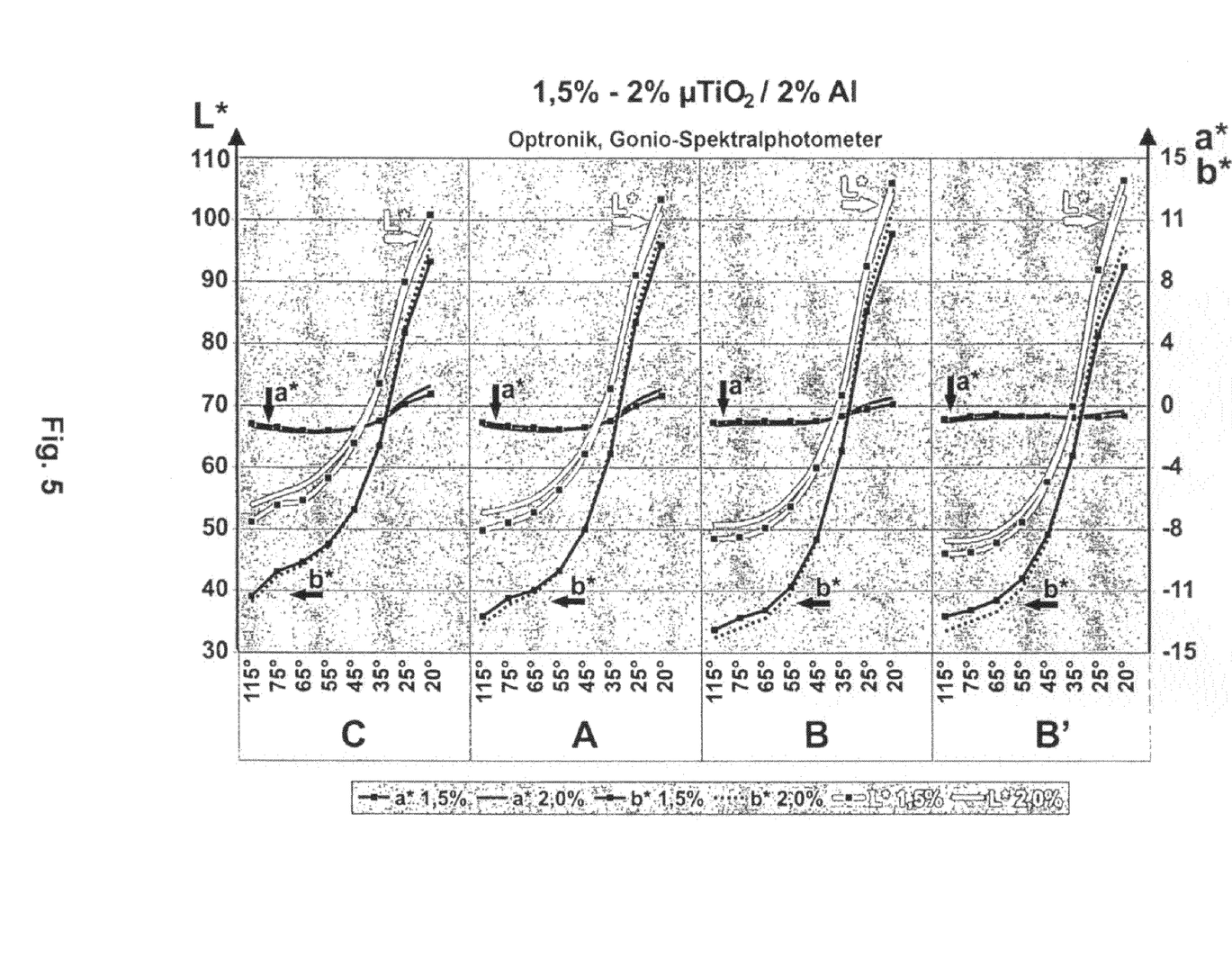
FIG. 5 shows the angle-dependant reflection properties of an effect paint that contains the titanium dioxide product prepared by the method according to the invention.

FIG. 5 shows reflections, which have been measured at different angles by the Gonio spectral photometer (Optronic GmbH) from effect paint samples that contain the reference sample C and samples A, B, and B' according to the invention, in accordance with the CIELAB colour description model. By means of the effect paint thus prepared, en extremely strong angle dependence is provided by coatings that contain the titanium dioxide according to the invention. The bright golden flip effect 20° b* is more than 8 and the deep blue flop effect 115° b* is below −11.

Furthermore, it should be stated that the intensity of the effect thus provided is high. Compared with the available known paint compositions, for an effect provided by the paint composition containing the titanium dioxide product according to the invention, only about 25% of a corresponding amount of titanium dioxide is needed in the paint composition to provide the same effect.

The invention claimed is:
1. A method of preparing a well-dispersable, rutile-structured, microcrystalline titanium dioxide product having a crystal size of less than 60 nm from a titanium dioxide starting material, the method comprising the stages:
   A: treating a titanium dioxide starting material to convert it into titanium dioxide so that
   (A1) the titanium dioxide starting material is treated with a base to have an alkaline pH value;
   (A2) a precipitate obtained from stage A1 is further treated with hydrochloric acid so that a final hydrochloric acid content is adjusted to 8 to 35 g/l;
   (A3) the precipitate obtained from stage A2 is neutralized into slurry to a pH value of 4.0 to 6.0;
   (A4) the neutralized slurry obtained from stage A3 is primed with a pretreatment chemical;
   (A5) the primed slurry obtained from stage A4 is calcinated; and
   B: further treating the titanium dioxide obtained from stage A to convert it into a titanium dioxide end product.
2. The method according to claim 1, wherein the pretreatment chemical is potassium dihydrogen phosphate, $KH_2PO_4$, or a mixture of potassium and phosphor compounds, which before or during calcination reacts into potassium dihydrogen phosphate.

3. The method according to claim 1 or 2, wherein the pretreatment chemical is added in an amount of 0.2 to 1% by weight, calculated as potassium dihydrogen phosphate.

4. The method according to claim 1 or 2, wherein in stage 4, the pretreatment chemical is added as solid powder to and mixed with the neutralized slurry, which is obtained from stage A3.

5. The method according to claim 1 or 2, wherein the titanium dioxide starting material is a solid titanium dioxide hydrate.

6. The method according to claim 5, wherein the titanium dioxide hydrate is prepared from ilmenite by means of a sulphate process.

7. The method according to claim 1, wherein the crystal size is less than 50 nm.

8. The method according to claim 1 or 2, wherein, at stage A2, the product obtained from stage A1 is elutriated in water by raising the temperature of the slurry by 40-45° C. and, after that, by adjusting the content of hydrochloric acid to the final hydrochloric acid content of stage A2.

9. The method according to claim 1 or 2, wherein, at stage A3, the neutralization is carried out with sodium hydroxide or sodium carbonate, after which the product is filtered and washed.

10. The method according to claim 1, wherein the stage B further comprises the following successive stages:
(B1) a mass obtained from calcination is wet-ground;
(B2) the mass obtained from wet-grinding is surface-treated;
(B3) the surface-treated mass is filtered and washed;
(B4) the mass obtained from stage B3 is wet-ground again; and
(B5) the mass obtained from stage B4 is spray-dried and spray-ground to prepare a final titanium dioxide product.

11. The method according to claim 10, wherein, at stage B4, the mass obtained from stage B3 is elutriated in water and an organic additive is added to the slurry.

12. The method according to claim 11, wherein the organic additive contains trimethylol propane.

13. The method according to claim 10 or 11, wherein the organic additive is added in an amount of 2 to 8% by weight.

* * * * *